United States Patent [19]

Licko et al.

[11] 4,432,012
[45] Feb. 14, 1984

[54] PROCESS FOR OFFSET CONVERSION TO GRAVURE

[75] Inventors: Ervin A. Licko, Norridge; Frederick W. Lind, Arlington Heights; Robert W. Richmond, Chicago; Walter W. Martin, Bellwood, all of Ill.

[73] Assignee: Mobil Oil Corporation, New York, N.Y.

[21] Appl. No.: 327,546

[22] Filed: Dec. 4, 1981

[51] Int. Cl.³ .............................................. H04N 1/46
[52] U.S. Cl. ...................................... 358/75; 358/37; 358/80; 358/280
[58] Field of Search ................... 358/75, 80, 160, 166, 358/280, 37

[56] References Cited

U.S. PATENT DOCUMENTS 2,691,696 10/1954 Yule ..................................... 358/280
4,065,788 12/1977 Meier et al. .......................... 358/166

Primary Examiner—Richard Murray
Attorney, Agent, or Firm—Alexander J. McKillop; Michael G. Gilman; Charles J. Speciale

[57] ABSTRACT

This invention is concerned with printing colored images on paper. More particularly, it is concerned with an improved method for preparing a set of engraved cylinders suitable for the reproduction of colored images on a web-fed gravure press.

22 Claims, 1 Drawing Figure

PROCESS FOR OFFSET CONVERSION TO GRAVURE

TERMINOLOGY AND PRIOR ART

The art of color printing by the gravure process has advanced considerably in recent years. This has come about as a result of technological developments which either improve the quality of the printed image, or reduce the cost of the process, or both. It is characteristic of the gravure process that it can print extremely long runs exceeding one million copies or so with excellent detail, good color consistency, and with excellent rendition of the tonal scale, all without remaking the printing cylinders. For these reasons, most of the long run publications for some years now have been printed by the gravure process. A survey of the gravure printing process and its history up to 1956 is given in "Rotogravure", by H. M. Cartwright and Robert MacKay, MacKay Publishing Company, Inc., Lyndon, Ky. (1956), the entire contents of which are incorporated herein by reference for background.

The term "gravure process", or "gravure", as used herein refers to that printing process in which papar is fed as a continuous sheet (web) to a press which uses screened engraved cylinders to carry the ink to the paper. Because the press is a rotary press, the process sometimes is referred to as "rotogravure", which term for present purposes shall be considered synonymous with gravure. The term "gravure cylinder" will be used herein to refer to an engraved cylinder that carries the ink to the paper in the gravure press.

The terms "quality", and particularly "high quality" as used herein with reference to printing color reproductions is intended to mean faithful reproduction of the copy. Unfortunately, there is no known objective measures of fidelity, with the result that each particular proof must be judged subjectively by one or more persons with experience in such matters. Although individually not objective, the members of a panel skilled in the art will in general agree with one another as to what defects exist, such as loss of detail, loss of highlights, poor register, poor overall fidelity, or excess color in the heavy tones or in the shadow areas of the picture. The appraisal by those skilled in the graphic arts is generally made with the knowledge that no reproduction process can be expected to give perfection, and that the judgment must be made within the context of the state of the art of a particular printing process. One making a judgement also takes into account economic and time limitations that may be imposed by the client, for example, and a degree of poor register acceptable for a Sunday supplement may be intolerable in a higher quality job. That the gravure process has advanced to the stage where it is capable of producing very high quality full-color reproductions is made evident by the average layman's response to the quality of the printing in the current production of the publication *National Geographic*, for example, which is produced by the gravure process.

The term "image" as used herein means any representation of the form and/or coloring of the subject to be reproduced, and is intended to include transparencies (film) as well as opaque renditions (prints) and color separation films. The term "copy" as used herein includes any image supplied by the client for reproduction. The term "offset separations" as used herein means dot-screened films which may be positives or negatives. These are used conventionally to expose photosensitized plates.

An attempt has been made herein to define clearly the most important terms that are used in the description of this invention. Those terms for which an explicit definition has not been given are intended to be interpreted in the light of current American usage in the printing industry. It is applicant's understanding that the terms used in the United States and in other countries to denote the same element or characteristic may be different, even perhaps to the extent of being misleading. For example, the word "halbton" is used in German to mean a *continuous* tone image, and it is applicant's understanding that this is frequently erroneously translated into the English "half-tone", which signifies a *screened* image.

Color reproduction the by gravure process, as with other printing processes, traditionally requires that the colored picture be photographed at least twice and most often four times through appropriate different filters to produce so-called color separations. These color separations, after many photographic steps and incorporation of a suitable screen, are used to produce chemically engraved cylinders, one for each color to be printed. Although a wide range of hues may be produced with two colors, a more complete range is achieved with the three basic colors generically referred to as yellow, magenta and cyan, but a black is often added, too. The toners used for rotogravure process inks are substantially transparent, and the printed image is formed by a subtractive process. Thus, the yellow is usually printed first and dried, and the red printed in exact register after the yellow. A beam of white light impinging on the printed paper at this stage of the formation of the print undergoes selective absorption of the blue and green components with reflection of the remainder. After the cyan is printed, absorption of none, some or substantially all of the spectral components of white light becomes possible depending on the distribution of the inks and their densities. Thus, greys and blacks may be formed by three-color printing. However, it is very common practice to add a separate black cylinder and to regard black (also referred to as key) as the fourth color to allow the printer better control of the hues in the reproduction at the time of printing. Thus, four color printing is very commonly used for quality work, but often additional special colors may be used or the type may be printed separately. In skilled hands and with adequate time and effort the traditional techniques are capable of yielding excellent results. Nonetheless, it is evident that when two or more different images are engraved on a single color cylinder, as is commonly done, the problem of ensuring exact register to within 0.001 inch translates into relatively lengthy production time and high cylinder preparation costs. And, the problem is aggravated by the usual chemical method for producing the engraving.

Traditionally, to prepare an individual gravure cylinder, the final, corrected, color separated film is transferred to a gelatinous tissue. The tissue in turn is adhered to the cylinder in the final printing position, along with other tissues to be printed together. The cylinder is then placed on an etching machine after painting the non-image areas with an acid-resistant compound and treated with etching acids. The objective in this step is to create numerous individual pits or cells separated from one another by a land. For quality gravure printing on paper, these usually number at least about 150 cells per linear inch, each cell of which will function to carry a precise amount of ink from the fountain and to deposit the ink at a particular location on the paper. The darker areas of the image are eaten away quickly and produce deep cells in the copper, whereas the lighter areas are more resistant and produce proportionally shallower cells. Often the etching is done in stages to better control the saturation, with different acid strengths used for the less and more saturated areas. The cylinders are cleaned, and chromed if desired, and are now ready for the press. The inks used in the printing process are limpid fluids which dry rapidly on evaporation of an organic solvent.

The foregoing description of the process for preparing the gravure cylinders from the copy provided by the client is of necessity superficial, and does not truly reflect the large amounts of time required of highly skilled operators to produce cylinders satisfactory for high quality color reproduction. Thus, although the cylinders, once prepared, are satisfactory for extremely long runs with minimum servicing, such as possibly rechroming, the cost of preparing these cylinders becomes a major factor which usually makes the process uneconomic for runs of less than about one million copies.

Within recent years a new electronic engraving process has been developed which produces cells in the cylinder by engraving or mechanically digging them with diamond stylii. The equipment for this process includes a scanning machine, a computer and an engraving machine. The electronic engraving process has no effect on the printing operation per se, but it represents an enormous step forward in simplifying the preparation of a set of four color gravure cylinders from client's copy, with consequent shortening of the necessary production time. This development potentially can lower cylinder production costs to the point at which runs substantially less than about one million copies become competitive with offset printing. This result is possible because basically, in the electronic engraving process, difficult to control chemical etching is replaced with mechanical engraving which is very precise and controllable, and at the same time the conventional slow, expensive photographic steps are replaced with very fast, cheap manipulation of electronic data.

The early versions of the new process still require the making of a color separated image, as in the conventional chemical process, and correction of the separations on film. The final corrected separations are used to prepare four continuous tone black and white prints or "bromides" each of which represents one of the four colors of the original picture. The bromide for one of the four colors is placed face up on the scanning cylinder with bromides of other images to be printed together. In this specification and claims, the image to be scanned will be referred to as the "input image", or simply "input", regardless whether these be bromides or other images to be discussed below. The scanning cylinder is located in the scanning machine. The scanning machine scans the rotating cylinder in some predetermined fashion point by point and line by line to determine the amount of light reflected from each location on the bromides. Photomultipliers or equivalent transducers in the scanning machine convert light reflections to a set of electronic signals corresponding quantitatively to the reflected light. As the electronic signals are generated, they are passed to the computer, where an electronic record of part or all of the set of signals for that color is stored in digitized form. As needed, the signals are read out of storage and passed to the engraving machine where a blank copper cylinder is revolving. Diamond stylii in the engraving machine are caused to vibrate in relation to the strength of the signal such that they engrave square pyramidal cells of the required depths in the surface of the revolving blank cylinder. The electronic engraving apparatus as a whole is manipulated such that the square pyramidal cells are engraved in a regular pattern to form an engraved image having the desired number of lines per inch and the proper cell configuration for a particular color. It will be recognized by those skilled in the art that although the early version of the electronic engraving process has many advantages over conventional processing, the problem of register in four color printing remains unchanged. This was remedied about five years ago when a newer version of the process became available in which the optical scanner had the capability to effect color separation simultaneously with measurement of point by point and line by line intensity. This permitted the use of a full color continuous tone images as the input to the process, and these needed to be mounted only once to generate four sets of signals corresponding to the four colors, thus eliminating register problems caused by replacing separation bromides. The new version of the electronic engraving process will be referred to herein as "direct color engraving."

As with many new processes that are based on substantial departures from conventional technology, there are advantages and manipulative steps in the electronic engraving process that are not readily available in the conventional process, and by the same token, it may be found that some of the conventional manipulative steps are no longer available in the electronic process. In other words, the new process is not likely to completely eliminate the need for skills and art in order to produce successful results, but rather to require a new set of skills and art to achieve this end.

The foregoing description of the electronic engraving process is of necessity brief. Recent patents and literature serve well to indicate in greater detail the nature of the apparatus, variants thereof, and the state-of-the-art particularly with reference to manipulation of the signals generated by the scanner. These signals may be altered either before or after storage in order to improve quality. Alterations that may be made include precise positioning of the image, enlargement or size reduction of the image, alterations of coloring, and unsharp masking. These manipulations collectively may be referred to as "electronic image processing," i.e., alteration of the digitized image prior to or during the formation of an engraved image. A general treatment of this subject is found in an article by T. M. Cannon and B. R. Hunt, entitled "Image Processing by Computer," which appears on pages 214 to 225 of the October 1981 issue of *Scientific American*, published by Scientific American, Inc., 415 Madison Avenue, New York, N.Y. 10017, the entire content of which is incorporated herein by reference to augment the description of the present invention. That article describes point by point operations on the picture elements (pixels) in which the operation on any given point is done without reference to the surrounding points, and of Fourier-domain processing which involves Fourier transforms. The operator, in using the control elements on the engraving machine, is likely to involve both types of image enhancing techniques. The unsharp masking control to be referred to later herein most likely involves Fourier domain processing to undo the image degeneration caused by scanning a moving image.

Another feature of the electronic engraving machine is that the square pyramidal shape of the cells may be modified to elongated cells or to compressed cells compared with the normal square pattern by altering the speed of rotation of the recording cylinder. These electronic and mechanical manipulation steps may be used by the cylinder maker in attempts to favorably affect quality. The following U.S. patents are noted for their detailed description of apparatus used in electronic engraving, and because they reflect the state-of-the-art.

U.S. Pat. No. 4,092,668 issued May 30, 1978 discloses an improved color adjustment circuit for a color scanner. The problem addressed by the inventors is the necessity to correct color to compensate for inadequacies that may be present in the printing ink. A description of direct color engraving and of the correction system is found in the disclosure.

U.S. Pat. No. 3,997,828 issued Dec. 14, 1976 addresses the problem of locating the engraved image with great precision (within e.g., about 0.01 of a millimeter) in order to assure register in color printing. Also described in the disclosure is the use of an imposed constant frequency screen signal to obtain the desired screen point distribution.

U.S. Pat. No. 4,057,838 issued Nov. 8, 1977 addresses the problem of adjusting the beginning and end of reproduction in an engraving unit. Disclosed herein and elsewhere is the use of analog to digital transducers to convert the analog signal from the scanner to digital information and to store the sets of digitized data in an appropriate memory device.

U.S. Pat. No. 4,013,831 issued Mar. 22, 1977 addresses the problem caused by the tendency of an engraving machine to engrave cavities of improper depth at the beginning of a line, which results in disturbing tone values at the border of the image.

The entire contents of the patents cited above are incorporated herein by reference and serve to supplement the description of the electronic engraving process given in the present disclosure. None of these patents are deemed to disclose or suggest the present invention.

A long standing problem in the gravure printing industry is the inability to produce good quality reproductions from screened copy. A client who has had images printed by offset or letterpress may wish to have a printing by gravure. In such instance, the client will have already available to him screened color separation films prepared for the prior work with offset. However, the screened images used in offset and letterpress are not compatible with the continuous tone requirements of gravure. A publisher cannot ask its advertisers to provide both dot screened and continuous tone copy for its printers. The production costs of correcting the colors for the additional copy and the conflicts in production dates prohibit this approach. Therefore, gravure printers have sought to make use of the dot screened copy supplied by the advertisers. To date, all of the attempts to convert screened copy to gravure engravings have been based on diffusing the dots into a continuous tone. The proposed methods all fall short of producing a high quality image. Gravure traditionally produces a printed picture with good contrast, much ink weight, and fine detail. Most conversion methods result in flat contrast, little ink weight, and softened detail.

One attempt at a conversion process uses an attachment to a camera lens to diffuse the dot screen during a photographic step. The results are poor at best. Another method uses a film called Scotch Print which is sandwiched between films and photographically contact printed to diffuse the dots. This result also is unsatisfactory. Converlog is a process that offers a partial solution to the problems of conversion. This method, along with another called Topan and one developed by the K. Walter Company, use a fine screen to break up the dot structures into smaller pieces. This is done either before the positives are made or during the transfer of the images onto the etch resistant tissue. The fine detail is not affected by these processes but the contrast still tends to be flat and the printed image lacks the normal ink weight. The foregoing processes are useable only for the conventional manufacture of engraved gravure cylinders. Up to now the electronic engraving process has not produced good results with dot screened copy, and the formation of moire' patterns remains a substantial hurdle.

U.S. Pat. Nos. 2,532,701; 2,543,393; 3,024,111; and British Pat. Nos. 706,688 and 706,689 relate to conversion processes, and to pre-proofing in conjunction therewith, and are incorporated herein by reference. None of these are deemed to show or make obvious the instant invention. These and other attempts to achieve a satisfactory offset to gravure conversion have been motivated not only by the frequent unavailability of continuous tone inputs, but also by the knowledge that pre-proofing a gravure job by offset before cutting cylinders could save considerable time and cost.

For reasons which will become clear later in this disclosure, we shall now briefly describe the Cromalin dry-process system for producing dot-screened full-color proofs on paper from offset separations. The system is supplied by E. I. DuPont de Nemours and Co. (Inc.) in the United States and in a number of foreign countries as well. To prepare a full color print, a clear photopolymer film (in this instance Cromalin film) covered with Mylar is laminated to a selected paper stock, and then the film is exposed in contact with a halftone positive, such as a positive offset separation. After the Mylar cover sheet is removed, the tacky clear screened image is toned with a dry powder that has been color matched to the production ink (press ink) corresponding to the color for that particular halftone. Repeating the laminating, exposing and toning for each process color gives a full color Cromalin print, or proof.

It is an object of this invention to provide a method for converting dot screened copy to high quality gravure engravings. It is a further object of this invention to provide a process whereby high quality gravure color reproductions are produced from offset separations. It is a further object of this invention to provide a low-cost, rapid method for converting dot screened copy to gravure. It is a still further object of this invention to provide an economically viable process for gravure runs of less than one million prints from dot screened copy. It is another object of this invention to provide a conversion process wherein dot-screened offset separations are used to produce a positive image suitable both as a pre-proof and an input for the direct electronic engraving of gravure cylinders. These and other objects will become apparent to one skilled in the art on reading this entire specification including the claims appended hereto.

BRIEF SUMMARY OF THE INVENTION

It has now been found that a dot-screened image may be used as input in an electronic engraving process with improved results if the copy is defocussed by a precise amount effective to blend the dots, as more fully described hereinbelow, and the resulting defocussed digitized image is operated on with an unsharp mask such as provided with the Helioklischograph to a degree effective to enhance detail without restoring dots to an objectionable degree. Highly effective defocussing is provided by moving the eyepiece of the scanner towards the input image.

With offset separations as the dot-screened copy, the input is formed simply by mounting the separations together with a white backing on the scanning cylinder, thus providing a rapid and inexpensive offset conversion process. This embodiment of the invention requires precision substitution of the separations to obtain satisfactory register.

In another embodiment of this invention, the offset separations are used to make a full color dot-screened positive image which is used as input to the electronic process, with defocussing and operation on the digitized image to enhance detail as described above. Although this embodiment introduces the extra step of preparing the full color input, this is more than compensated by elimination of the register problem. Additionally, under optimal conditions more fully described hereinbelow, this embodiment provides a highly reliable pre-proofing method when the positive image is a print.

In a particularly preferred embodiment of this invention, a full color dot-screened positive print is prepared wherein the colorants consist essentially of toners compatible with the press inks to be used. Such prints may be made with the Cromalin color proofing system, for example, which is used for proofing and adjusting offset separations. To the best of our knowledge, Cromalin prints have not heretofore been used as inputs to the electronic engraving process.

DETAILED DESCRIPTION AND EQUIVALENTS

Figure 1:
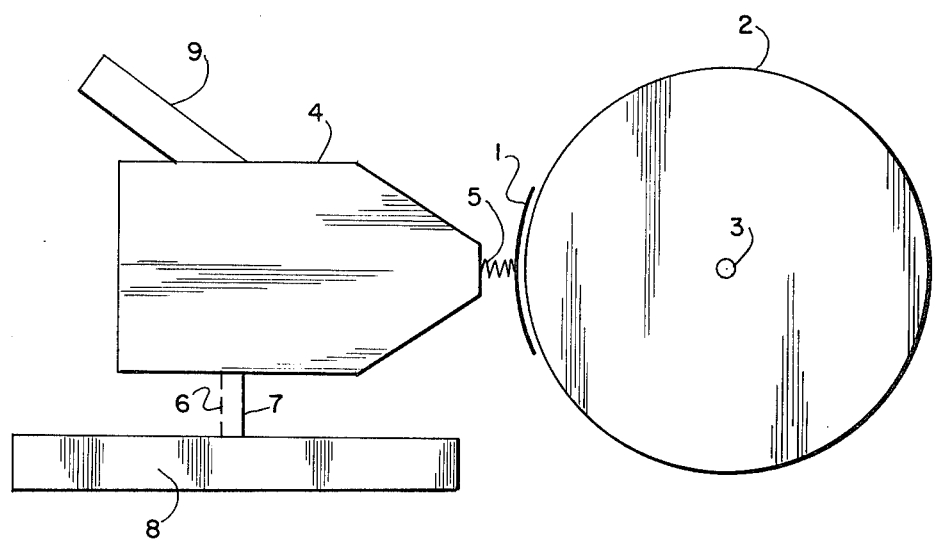
FIG. 1 is a block diagram illustrating the present invention.

Because it is believed that one skilled in the art of gravure printing will best understood this invention by next considering actual examples, this invention will now be illustrated by the examples. It is to be understood, of course, that the examples are illustrative and are not to be construed as limiting the scope of the invention which is described by this entered specification including the claims appended hereto.

EXAMPLES

The examples which follow describe a series of tests to convert offset separations to gravure. All tests were made on a Helioklischograph, Model Number K193, which is capable of direct color engraving. This machine normally is used with either color separation bromides or a single continuous tone full color print as input. The scanning machine, in the case of a full color print, performs the usual scanning function and at the same time directly provides color separation. The information generated by the scanning machine is encoded and stored in digital form, and is read out as needed to engrave the four separate gravure cylinders. The computer associated with the electronic engraving machine is capable of processing the image mathematically to enhance or modify color renditions, and it includes among such programs an unsharp masking program which is believed designed to restore the digitized image which has been degraded by the rotary motion of the scanning cylinder. The controls of the mask provide the engraver with independent settings for the highlights (abbreviated herein H.L.) as well as for the shadows (abbreviated herein S.H.) of the three colors; for the key; and for the starting point (abbreviated herein St.Pt.). All of these controls have settings that range from zero to 10. The mask may be used with the scanning machine either in the conventional color separation mode or in in the direct color engraving mode.

Example 1 is not considered illustrative of this invention to the extent that the suggestion to defocus the dots by *increasing* the distance between the eyepiece of the scanner and the image was provided orally to one of us by a representative of the manufacturer of the engraving machine. The other examples illustrate the development of specific embodiments of this invention.

Except as otherwise noted, all images including the Cromalin prints were 7 mils thick to provide dimensional stability.

EXAMPLE 1

A set of offset separation positives was positioned on a white backing and scanned by the scanning machine. The optics of the scanning heads were put out of sharp focus by changing the working distance from the eyepiece of the scanner to the image on the by film plus-zomils (see below). The engraving machine was programmed to engrave 150 cells per linear inch, i.e., a 150 line screen.

The computer was adjusted to engrave the yellow cylinder with elongated cells, the magenta and cyan with compressed cells, and the black with elongated cells. These settings were used on all subsequent tests unless otherwise noted, and were based on prior experience with the machine.

The focus was adjusted initially to be as sharp as possible. Then a dial micrometer was set in a specially designed mounting, attached to the scanning head, and set to read zero in the sharp focus position. The scanning head was then defocused by precisely plus 20 mils, which was judged to be the maximum distance out-of-focus permissible before the image blurred excessively. The adjustment of the amount out-of-focus is conveniently described as the change made in the normal working distance from the image to the eyepiece. The working distance in the present case is about ½ inch, and an *increase* of this distance by 0.020 inches will be referred to as an out-of-focus adjustment of *plus* 20 *mils*; likewise, defocusing by moving the eyepiece closer to the image by that same distance (0.020 inches) will be referred to herein as adjusting the out-of-focus to *minus* 20 *mils.*, or defocusing by *minus* 20 *mils.*

The mask was set at 3.

The test results after engraving showed a poor register of printed images with too much color in the midtone and shadow end of the pictures. Additionally, the detail was poor and the colors off. The results were judged to be unacceptable and not salable.

EXAMPLE 2

Another set of cylinders was made from offset separation positives on white backing with the computer set to engrave a 175 line screen. Also, the scanning optics were moved *closer* to the image instead of away from the image to put it out-of-focus. Decreasing the distance from the image reduced the loss of light intensity and appeared to produce detail while blending the dots sufficiently to produce good engraving. A dial micrometer was again used, as it was throughout this series of experiments, to establish the precise amount of defocusing, in this instance *minus* 20 mils. Also, an adjustment in the computer was made to the color curves for the basic four colors. The adjusted curves restricted the signal generated in the photomultipliers in the scanning heads. The signals was lessened over its entire range so that the engraving machine would engrave shallower cells from highlight, to mid-tone, to the shadow end. This new curve in the colors was tried to reduce the ink saturation of the previous test.

The mask setting remained unchanged at 3.

The cylinders were engraved and proofed in a press. The printed image showed an improvement in quality but the mid-tones and shadow end were still too saturated and "choked-up".

EXAMPLE 3

The computer was reset with a new curve for all four colors, this time to reduce the signal for only the midtones. The computer was adjusted to cut a 200 line screen. Offset separation positives were used as in Examples 1 and 2.

The mask setting was unchanged at 3.

The cylinders were cut and the printed images reviewed. The corrections to the settings improved quality, but not drastically. The shadow end was now too heavy in ink saturation and the change in the line screen produced a lack of tone in the highlights.

In Examples 4 through 10 which follow, certain parameters were fixed and the changes that were made represent attempts to further enhance the image by adjusting saturation levels and colors.

The fixed parameters in Example 4 through 10 were as follows:

The computer was set to engrave elongated cells for yellow and black, and compressed cells for magenta and cyan;

The input image in all cases were screened offset color separations, which were positives and which were provided with a white backing.

The computer was set to cut a 200 line screen;

The out-of-focus was maintained at minus 20 mils;

The mask setting was maintained at 3.

EXAMPLE 4

The color curve light end was reset, with decreased curve to mid-tone and shadows. The proofs showed improvement over Example 3 but with shadows too saturated and register poor.

EXAMPLE 5

The color curve was adjusted in the shadows, but proofs showed shadows too saturated, register poor, and color quality poor.

EXAMPLE 6

The color curve was again adjusted in the shadows with improved results compared with Example 5. The register was good.

EXAMPLE 7

The color curve was the same as Example 6. This time the mid-tones and shadows were too saturated. Register was poor.

EXAMPLE 8

The color curve was reset in mid-tones and shadows. Results showed improvement over test 7, with shadows slightly saturated. Different screen rulings on positives shown to effect density and color quality. Register satisfactory.

EXAMPLE 9

In the example the color curve was adjusted to reduce density over all. Proofs showed the black light end too saturated. Register was poor.

EXAMPLE 10

Color curve reset in highlights of black, increased and decreased for two black cylinders. Results were the light end missing tones on all colors.

EXAMPLE 11

As in all previous examples, offset separations on white backing were used as the image to be scanned. The computer was set to cut a 200 line screen and the out-of-focus was adjusted to minus 20 mils. The color curve was the same as for Example 7, and the black the same as for Example 10.

The unsharp masking setting was increased above the setting of 3 and this change is considered responsible for the better detail in the proofs. However, light end missing tone.

EXAMPLE 12

This test was essentially the same as that described in Example 11 except that the out-of-focus adjustment was decreased to minus 17 mils and the unsharp masking was increased to a setting of 9 for all colors. The results of these changes included increase in tone in light end, acceptable saturation of colors, and incipient pattern formation (dots) but at a level judged to be commercially acceptable. Register was poor.

EXAMPLE 13

Ribbons were cut in this test with different engraving processes, thus conducting two types of test with one set of cylinders.

In part A, conventional color separation engraving was used to duplicate Example 12 except that 4 mil films were used instead of 7 mil films. The results were the same as with Example 12 but the register was poorer than with the 7 mil films.

In part B, direct color engraving was used with Cibachrome and with Cromalin screened full color prints as input. The full color prints were prepared from offset separations. A 200 line screen was cut and the out-of-focus adjusted to minus 17 mils. Standard color curves were used.

The unsharp masking settings were as follows:

| Settings | 3 color/key |
|---|---|
| H.L. | 3.0/2.0 |
| S.H. | 4.0/3.0 |
| St. Pt | 3 |

With Cibachrome—Too saturated in yellow and magenta in mid-tones and shadows. Key too saturated in highlight and mid-tones. Better overall than positive separations on white backing.

With Cromalin—Color quality closer to original because of offset toners.

EXAMPLE 14

This example consists of a set of three tests using Cibachrome full color positive prints prepared from offset separations and direct color engraving. All three tests were engraved with 200 line screens with out-of-focus set at minus 17 mils, and with unsharp masking increased over that used in Example 13. The setting for this test was as follows:

| Settings | 3 color/key |
|---|---|
| H.L. | 4.0/2.0 |
| S.H. | 5.0/3.0 |
| St. Pt | 3 |

Further specifics and the results with the three tests were as follows:

TEST #1: Color curve same as Example 13.
RESULT: Change in unsharp masking increased detail with good results.
TEST #2: Color curve changed to reduce midtones in all colors.
RESULT: Improvement over Example 13 Cibachrome test.
TEST #3: Color curve same as Test #1, this example, and color correction reset to take yellow out of blue colors.
RESULT: Color correction OK.

EXAMPLE 15

This example and Example 16 describe further tests made with offset color separation positives on white backing, and were made essentially to confirm prior results. In both Example 15 and Example 16, 200 line screens were engraved, the out-of-focus setting was minus 17 mils, and the unsharp masking was set at 9.

In Example 15 two tests were made as follows and with the results described:
TEST #1: Color curve same as Example 14.
RESULT: High light and mid-tones too saturated.
TEST #2: Color curve reduced in highlight and mid-tones.
RESULT: Color curve produced good results, but slightly too saturated overall.

EXAMPLE 16

In this example the same images and conditions were used as in Example 15 except that the color curve was reduced in highlight and mid-tones in all colors, more than Test #2 of Example 15.

The color quality was judged deficient and the register was poor.

The Examples 17–21 inclusive, which follow, show a sequence of unusually successful conversion results wherein dot-screened separations are used to prepare a Cromalin positive full color screened print, and this in turn is used with the direct color process to prepare a set of engraved cylinders. In all of these examples a 200 line screen was cut and the out-of-focus adjustment set at minus 17 mils. All were run with the same mask settings that were used in Example 14, specifically:

| Settings | 3 color/key |
|---|---|
| H.L. | 3.0/2.0 |
| S.H. | 4.0/3.0 |
| St. Pt | 3 |

EXAMPLE 17

Color correction and color curve same as in Example 14. Cromalins made with toners compatible with Commerical Inks "A" (Avon).
RESULT: Improvement over other processes and prints. Light end and mid-tone of blue color curve a little weak. Yellow too weak in reds. Red highlights too weak.

EXAMPLE 18

Color corrections made to increase yellow in reds in Example 17.
RESULTS: Very good.

EXAMPLE 19

This example was run essentially to confirm the results of Example 18. It was noted that the Cromalin prints require a stable backing for proper usage on the scanning cylinder.
RESULTS: Again, very good.

EXAMPLE 20

In this example a Cromalin input was again used and the color curves were reset to reduce saturation in all colors in shadow end.
RESULTS: Outstanding.

EXAMPLE 21

This example was run to compare Cromalins made with various toners, specifically toners compatible with Commercial Inks "A" (Avon), with Commercial Inks "B" (Spiegel), and offset toners cut with white toner.
RESULT: Quality good. Offset toners cut with white toners better than either set compatible with Commercial Inks "A" or "B".

Example 2 above demonstrates that defocussing by moving the optics toward the image rather than away from it by an amount effective to blend the dots reduced loss of light intensity and produced better detail. Examples 1 and 2 demonstrate the recognition that a precise amount of defocussing is desirable, i.e., a known and repeatable amount, so that should a remake or a second set of cylinders be required, this may be made to duplicate the first set in amount of defocus. It is evident, however, that the amount out of focus effective to blend the dots will depend to some extent on the nature of the dots on the input.

While the means to defocus utilized in the foregoing examples is physical displacement of the optics, and means to establish the precise amount a micrometer, it appears evident that the system could be altered to accept an auxilliary lens, the insertion or removal of which would function to defocus a sharply focussed scanning head by a precise amount. This variant is contemplated as within the scope of this invention.

Examples 2 to 10, inclusive, illustrate modification of the digitized color separated image by the computer to change color values and saturation in order to enhance the reproduction in one or more ways. These examples also illustrate the relatively frequent occurrence of less than really good register inherent with color separations as inputs, which is no better with electronic engraving than it is with conventional etching.

Examples 11 and 12 illustrate that increasing the unsharp masking of the digitized image can produce better detail without encountering objectionable formation of dots when used in conjunction with an out-of-focus input.

Example 13 illustrates the use of full color positive prints made from offset separations as inputs. These were used in conjunction with defocussing and unsharp masking. In one part of the test the print was prepared by using Cibrachrome professional paper, and in the other part by using the Cromalin process described above. In both instances the results were judged better than those obtained when offset separations were used as inputs. Reproductions with the Cromalin input had very good fidelity with regard to color quality, and it was deduced that this was due to the fact that the colorants were toners rather than dyes.

The Cibachrome Graphic which is used herein was developed by Ciba-Geigy Photochemie Ltd. of Fribourg, Switzerland, as a proofing procedure for gravure to evaluate gravure color separations at various stages of processing prior to preparing cylinders for conventional etching. This process and its applications are described in brochures provided by the Ciba Photochemical Division, New York, N.Y., and elsewhere. Basically, the process utilizes a direct positive paper of professional quality in which pure azo dyes are incorporated in a silver halide layer. It is recognized by the manufacturer that the Cibachrome Graphic dyes do not match all sets of color inks used in gravure printing, and that to achieve a reasonable simulation of the expected press reproduction it may be necessary to employ special filters and adjustments of exposure. It is intimated even with such precautions that an exact match for all hues should not be expected. This is understandable since the spectral characteristics of the dyes on the photograph and of the toners in the inks are not likely all to be sufficiently close to satisfy such expectation.

Examples 17 to 21 illustrate that compatible toners are readily selected in producing a Cromalin type print such that good to excellent engravings result. The flexibility offered when the positive input is prepared with colorants consisting essentially of toners as compared with dyes is a definite advantage and is a preferred embodiment of this invention because with suitable selection of toners, such as toners identical with or modified from those used in the press inks, the positive print serves as an excellent pre-proof as well as input to the scanning machine. The term "compatible with" as applied herein to the toners used in preparing the positive print is intended to include toners identical with those used in the press inks as well as desirable physical modifications thereof. Such compatible toners also include those in which a color bias may be present, and which bias serves to compensate for a color bias in the engraving equipment.

In general, highest quality reproductions are achieved with the present invention with dot-screened copy having a screen no coarser than about 133 lines per inch, and engraving with a screen at least about 150 lines to the inch.

The art of gravure cylinder making and the interacting field of electronic image processing are advancing rapidly. Variants of the present invention may be visualized, some of which may not yet be available, and some of which may be advantageous. For example, a Cromalin type positive film may be prepared by utilizing a transparent film or sheet instead of paper for the first lamination, and scanned with transmitted light; or, if a white backing is provided, it may be scanned with reflected light. Scanners of a different type than that now available with the Helioklischograph K193 may be developed which may be more efficient and may not require either the input or the scanning head to be in motion during scanning.

With regard to electronic image processing, it is known, from the above noted reference to the publication of Cannon and Hunt for example, that there is now available a computer program for restoring out-of-focus images, and a different program for restoring motion-blurred images. It is therefore conceived and considered within the scope of this invention to defocus electronically a sharply focussed digital image, and to restore the defocussed image by another computer program effective to enhance sharpness without recreating dots.

The present invention will now be described with reference to FIG. 1. The dot-screened image (1) is mounted on cylinder (2) which is rotatably mounted on a stationary bed (not shown). The axis of rotation is (3). Point-to-point scanning means (4) is positioned to receive light radiation (5) from the image (1), and is initially positioned at position (6) by defocusing means (8) such that the image as observed in the eyepiece (9) is precisely in focus. Prior to scanning, scanning means (4) is moved to the out-of-focus position (7) by defocusing means (8), and the defocused image is scanned.

Whereas we have described how to make and how to use our invention, and the best mode thereof to the best of our present knowledge, these descriptions being given in the context of the preset state of the art, variations of this invention now obvious or that will become obvious with new developments in the art may be made without departing from the spirit and scope of this invention.

What is claimed is:

1. A method for converting offset to gravure by the electronic engraving process, which process utilizes an electronic engraving machine, a computer and a scanning machine wherein an input image is scanned on a point to point and line to line basis thereby forming an electronic image that is passed to said computer wherein said electronic image is digitized and mathematically altered by one or more procedures to restore or enhance its quality, and controlling said engraving machine with the readout from said enhanced image, said conversion method comprising:

providing positive offset separations on white backing as sharply focussed input to said scanning machine;

precisely defocussing said input by an amount effective to blend said dots, said defocussing being effected by moving said scanning head towards said image or by equivalent optical or electronic means;

scanning said defocussed input thereby forming an out-of-focus digitized image in said computer;

mathematically enhancing the detail of said out-of-focus image; and controlling said engraving machine by the readout of said detail-enhanced image.

2. The method described in claim 1 wherein a controllable unsharp mask is used to effect the enhancement of detail of said out-of-focus image.

3. The method described in claim 2 wherein said unsharp mask control is set at a point effective to produce maximum detail but ineffective to restore dot formation to an objectionable level.

4. The method described in claims 1 or 2 or 3 including the step of mathematically manipulating said digitized image to enhance color rendition.

5. A method for converting offset to gravure by the electronic engraving process, which process utilizes an electronic engraving machine, a computer and a scanning machine wherein an input image is scanned on a point to point and line to line basis thereby forming an electronic image that is passed to said computer wherein said electronic image is digitized and mathematically altered by one or more procedures to restore or enhance its quality, and controlling said engraving machine with the readout from said enhanced image, said conversion method comprising:

providing positive offset separations on white backing as sharply focussed input to said scanning machine;

precisely defocussing said input by an amount effective to blend said dots, said defocussing being effected by moving said scanning head or by equivalent optical or electronic means;

scanning said defocussed input thereby forming an out-of-focus digitized image in said computer;

mathematically enhancing the detail of said out-of-focus image to a degree effective to produce maximum enhancement without restoring dot formation in an objectionable degree; and; and controlling said engraving machine by the readout of said detail-enhanced image.

6. The method described in claim 5 wherein a controllable unsharp mask is used to effect the enhancement of detail of said out-of-focus image.

7. The method described in claim 6 wherein said unsharp mask is a program effective for restoring motion-blurred image.

8. The method described in claims 5 or 6 or 7 including the step of mathematically manipulating said digitized image to enhance color rendition.

9. The method described in claims 1 or 2 or 3 or 5 or 6 or 7 wherein said computer is programmed to engrave a screen of at least about 150 cells per linear inch.

10. In the direct color electronic engraving process for the manufacture of gravure cylinders suitable for printing high quality reproductions on paper, which process utilizes an electronic engraving machine, a computer and a scanning machine wherein a continuous tone and sharply focussed full color positive input image is scanned on a point to point and line to line basis to form a color separated electronic image that is passed to said computer wherein said separated electronic image is digitized and mathematically altered by one or more procedures, one of which may be unsharp masking, thereby restoring or enhancing the quality of said digitized image, and controlling said engraving machine with the readout from said enhanced image, the improvement, whereby converting offset separations to gravure, which comprises:

preparing a full color dot-screened positive image from said offset separations:

preparing said scanning machine to scan said dot-screened image;

precisely defocussing said dot-screened image prior to scanning by an amount effective to blend said dots, said defocussing being effected by moving said scanning head towards said image or by equivalent optical or electronic means, thereby forming an out-of-focus digitized image in said computer, and controlling said engraving machine by the readout of said digitized image.

11. The improvement described in claim 10 including the steps of mathematically enhancing the detail of said out-of-focus digitized image and controlling said engraving machine by the readout of said enhanced image.

12. The improvement described in claim 10 wherein said full color dot-screened positive image is a print.

13. The improvement described in claim 12 including the steps of mathematically enhancing the detail of said out-of-focus digitized image and controlling said engraving machine by the readout of said enhanced image.

14. The improvement described in claim 10 wherein said full color dot-screened positive image is a print wherein the colorants consist essentially of toners compatible with the press inks.

15. The improvement described in claim 14 wherein said print is a Cromalin print.

16. The improvement described in claim 14 including the steps of mathematically enhancing the detail of said out-of-focus digitized image and controlling said engraving machine by the readout of said enhanced image.

17. The improvement described in claim 16 wherein said print is a Cromalin print.

18. The improvement described in claims 10 or 11 or 12 or 13 or 14 or 15 or 16 or 17 wherein said offset separations have not coarser than about a 133 line screen and said computer is set to engrave at least about a 150 line screen.

19. The improvement described in claims 10 or 11 or 12 or 13 or 14 or 15 or 16 or 17 wherein said offset separations have not coarser than about a 133 line screen, said computer is set to engrave at a screen having at least 150 lines per linear inch, and said digitized image is altered to enhance it color-wise prior to said readout.

20. The improvement described in claim 11 or 13 or 16 or 17 wherein said enhancement of detail is effected by the unsharp mask up to a point effective to enhance said digitized image without recreating dots to an objectionable degree.

21. In the direct color electronic engraving process for the manufacture of gravure cylinders suitable for printing high quality reproductions on paper, which process utilizes an electronic engraving machine, a computer and a scanning machine wherein a continuous tone and sharply focussed full color positive input image is scanned on a point to point and line to line basis to form a color separated electronic image that is passed to said computer wherein said separated electronic image is digitized and mathematically altered by one or more procedures, out of which may be unsharp masking, thereby restoring or enhancing the quality of said digitized image, and controlling said engraving machine with the readout from said enhanced image, the improvement, whereby converting offset separations to gravure, which comprises:

preparing a full color dot-screened positive image from said offset separations;

preparing said scanning machine to scan said dot-screened image;

precisely defocussing said dot-screened print prior to scanning by an amount effective to blend said dots, said defocussing being effected by moving said scanning head or by equivalent optical or electronic means, thereby forming an out-of-focus digitized image in said computer;

mathematically enhancing the detail of said out-of-focus digitized image; and controlling said engraving machine by the readout of said digitized image.

22. The improvement described in claim 21 wherein said full color dot-screened positive image is a full color print wherein the colorants consist essentially of toners compatible with the press inks.

* * * * *